(12) United States Patent
Cinotti et al.

(10) Patent No.: US 6,945,530 B2
(45) Date of Patent: Sep. 20, 2005

(54) DEVICE FOR CONVEYING STACKS OF SHEETS OF PAPER

(75) Inventors: Andrea Cinotti, Bologna (IT); Luca Schiavina, Bologna (IT)

(73) Assignee: Innopack S.r.l. (IT)

( * ) Notice: Subject to any disclaimer, the term of this patent is extended or adjusted under 35 U.S.C. 154(b) by 82 days.

(21) Appl. No.: 10/638,520

(22) Filed: Aug. 11, 2003

(65) Prior Publication Data

US 2004/0104527 A1 Jun. 3, 2004

(30) Foreign Application Priority Data

Aug. 13, 2002 (EP) ............................................ 02425528

(51) Int. Cl.⁷ ............................................. B65G 15/14
(52) U.S. Cl. ...................... 271/240; 414/788; 198/626.5
(58) Field of Search ......................... 271/240; 414/788; 198/626.5, 726

(56) References Cited

U.S. PATENT DOCUMENTS

| | | | | |
|---|---|---|---|---|
| 1,109,259 A | * | 9/1914 | Sons et al. ................. | 53/387.3 |
| 3,595,369 A | * | 7/1971 | Boulay et al. .............. | 198/434 |
| 4,641,742 A | * | 2/1987 | Igarashi et al. .......... | 198/626.5 |
| 4,767,116 A | * | 8/1988 | Eberle ......................... | 271/238 |
| 5,143,204 A | * | 9/1992 | Owen et al. ................. | 198/726 |
| 5,269,119 A | * | 12/1993 | Tolson ........................ | 53/374.5 |
| 5,492,216 A | * | 2/1996 | McCoy et al. ........... | 198/626.5 |
| 5,775,068 A | * | 7/1998 | Strasser et al. ............... | 53/550 |
| 5,950,804 A | * | 9/1999 | Farkas ...................... | 198/626.1 |
| 6,293,544 B1 | * | 9/2001 | Fedinatz ..................... | 271/243 |
| 6,296,107 B1 | * | 10/2001 | Baumgartner-Pichelsberger ........... | 198/626.6 |
| 6,360,873 B1 | * | 3/2002 | Bonnain et al. ......... | 198/419.3 |
| 6,585,262 B2 | * | 7/2003 | Nakanishi ................... | 271/270 |
| 6,669,006 B2 | * | 12/2003 | Antoniazzi et al. ...... | 198/461.1 |

FOREIGN PATENT DOCUMENTS

| | | |
|---|---|---|
| EP | 0 373 331 A2 | 6/1990 |
| EP | 0 515 320 A1 | 11/1992 |
| EP | 1 227 040 A1 | 7/2002 |

* cited by examiner

*Primary Examiner*—Douglas Hess
(74) *Attorney, Agent, or Firm*—Michael Best & Friedrich LLP

(57) ABSTRACT

In a device for conveying stacks of sheets of paper, each stack is caused to advance along a pre-set path inside a pocket, which has a resting surface for supporting the stack and is provided with at least one pressure member designed to grip the stack on the resting surface during at least part of the displacement of the pocket along the path.

7 Claims, 2 Drawing Sheets

DEVICE FOR CONVEYING STACKS OF SHEETS OF PAPER

The present invention relates to a device for conveying stacks of sheets of paper or the like.

In particular, the present invention relates to a device for conveying stacks of sheets of paper or the like of the type comprising a pocket conveyor, which extends from an input station to an output station and is provided with a plurality of pockets, each of which has a resting surface for a respective stack and is designed to feed the stack itself to the aforementioned output station and against a sheet of wrapping paper, which is subsequently folded over the stack in a substantially U-shaped configuration.

BACKGROUND OF THE INVENTION

Known conveyor devices of the type described above present some drawbacks, the main one of which derives from the fact that, when the operating speed exceeds a pre-determined value, the contact of each stack against the corresponding sheet of wrapping paper can jeopardize correct positioning of the sheets with respect to one another and, consequently, of the sheets with respect to the sheet of wrapping paper.

SUMMARY OF THE INVENTION

The purpose of the present invention is to provide a device for conveying stacks of sheets of paper or the like which is free from the drawbacks outlined above.

According to the present invention, a device is provided for conveying stacks of sheets of paper or the like, the device comprising a pocket conveyor equipped with a plurality of pockets, each of which has a resting surface for a respective said stack and is designed to cause the stack to advance along a path that is substantially parallel to said resting surface, and being characterized in that it comprises pressure means set along said path in order to grip each of said stacks on said resting surface during at least part of the displacement of the stack along the path.

BRIEF DESCRIPTION OF THE DRAWINGS

The invention will now be described with reference to the annexed drawings, which illustrate a non-limiting example of embodiment thereof and in which.

DETAILED DESCRIPTION OF THE INVENTION

Figure 1:
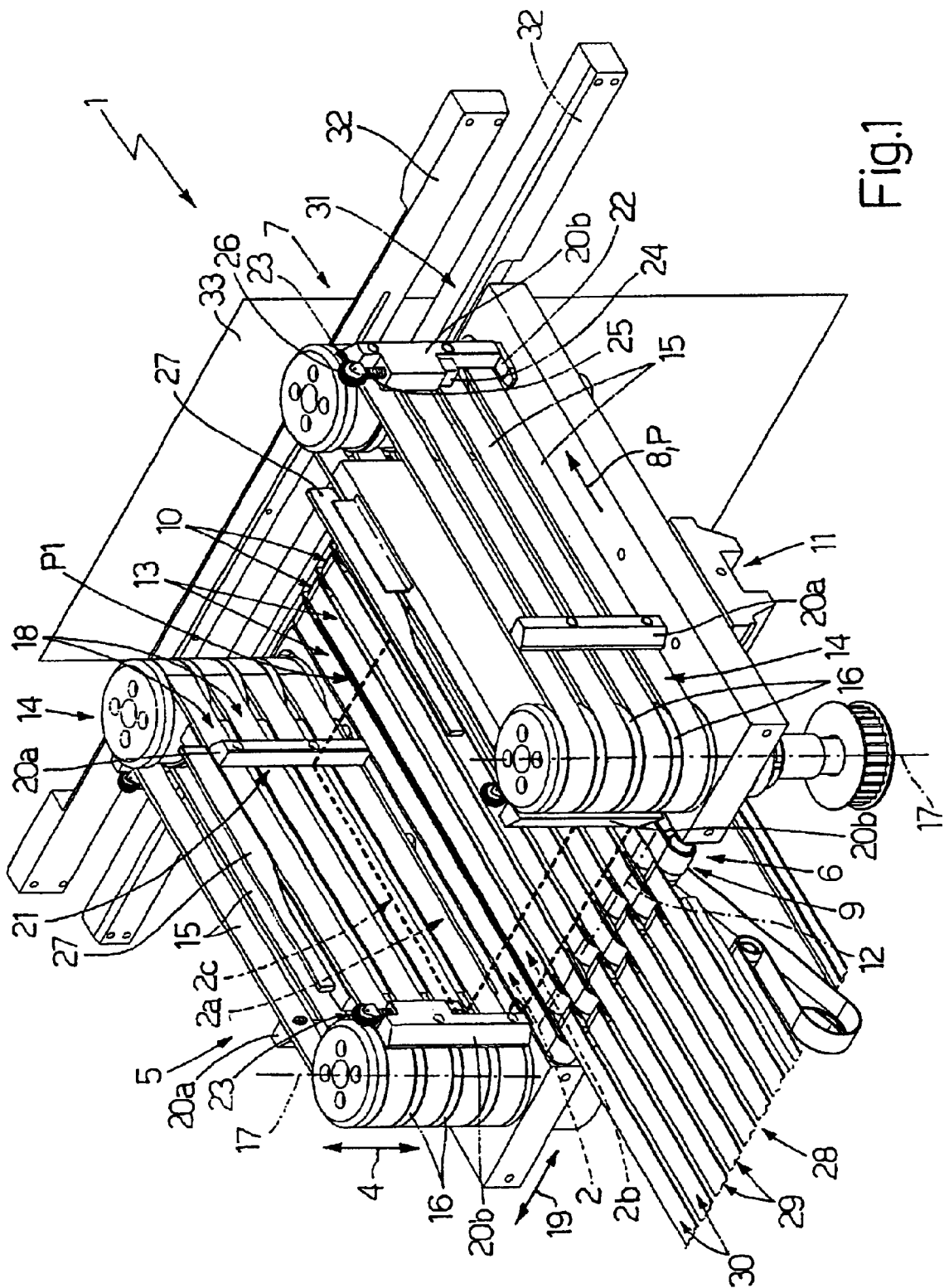
FIG. 1 is a schematic perspective view of a preferred embodiment of the conveyor device according to the present invention.
Figure 2:
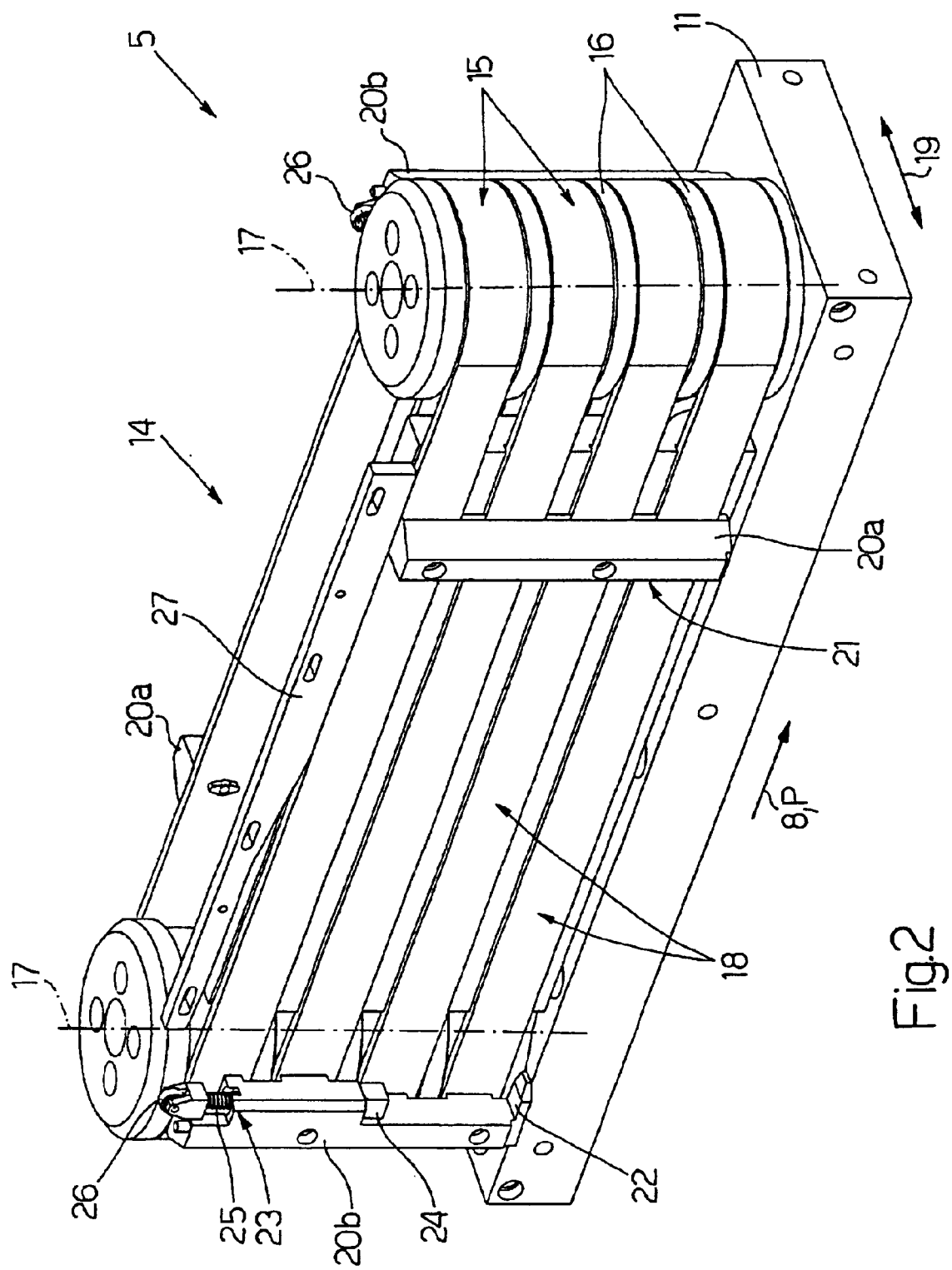
FIG. 2 is a schematic perspective view of a detail of FIG. 1.

With reference to FIG. 1, number 1 designates, as a whole, a device for conveying stacks 2 of sheets (not illustrated), each of which comprises a plurality of sheets set on top of one another in a pre-determined direction 4, and has two larger side faces 2a parallel to one another and perpendicular to the direction 4, two smaller side faces 2b parallel to one another and perpendicular to the faces 2a, and two smaller side faces 2c parallel to one another and perpendicular to the faces 2a and 2b.

The device 1 comprises a pocket conveyor 5, which extends from an input station 6 to an output station 7 and is designed to cause the stacks 2 to advance in succession in a predetermined direction 8 and along a pre-determined path P.

The conveyor 5 comprises a bottom belt conveyor 9, which comprises, in turn, a plurality of belts 10, each of which is designed to move in a vertical plane parallel to that of the other belts 10 and is wound in a loop around a pair of pulleys (not illustrated), one of which is driven in a continuous way. The said pulleys are mounted on a frame 11 of the device 1, so that they can turn about respective axes 12 transverse to the direction 8.

Each belt 10 has a top conveying branch 13, which is substantially co-planar to the branches 13 of the other belts 10 so as to define a conveying surface P1 that is substantially horizontal, on which each stack 2 is caused to advance "lying flat", i.e., with one of the faces 2a set on the surface P1, with the faces 2b set perpendicular to the direction 8, and with the faces 2c set parallel to said direction.

The conveyor 5 further comprises two side belt conveyors 14, which extend parallel to the direction 8, are set on opposite sides of the path P, each of which comprises a respective plurality of belts 15, each of said belts being able to move on a horizontal plane parallel to that of the other belts 15, and is wound in a loop around a pair of pulleys 16, one of which is motor driven in an intermittent way. The pulleys 16 are mounted on the frame 11, so that they can turn about respective axes 17 parallel to the direction 4.

Each belt 15 has a side conveying branch 18, which is substantially co-planar to the branches 18 of the other belts 15 of the corresponding conveyor 14, faces a corresponding branch 18 of the other conveyor 14, and is set at a distance from the corresponding branch 18, which is at least equal to the width of a stack 2 measured parallel to a direction 19 orthogonal to the directions 4 and 8.

Mounted on the belts 15 of each conveyor 14 is a plurality of pushing-and-accompanying elements 20 (in the case in point, four elements 20), which are caused to advanced in phase with the elements 20 of the other conveyor 14 and can be divided into two pairs of elements 20. The elements 20 of each of the aforementioned pairs define, together with corresponding elements 20 of the other conveyor 14 and the belts 10, a pocket 21, which has a length, measured parallel to the direction 8, at least equal to the length of the stack 2, which is also measured parallel to the direction 8.

Each pocket 21 is, thus, limited at the front in the direction 8 by two elements 20, designated, in what follows, by 20a, and at the rear in the direction 8 by two elements 20, designated, in what follows, by 20b. Each element 20b is substantially L-shaped, has a bottom jaw 22 that is substantially plane and co-planar to the surface P1, and is provided with a top pressure member 23 comprising a pin 24, which extends in the direction 4 and above the jaw 22, is slidably coupled to the element 20b, and is normally kept in a raised released position, in which the pin 24 sets itself at a distance from the jaw 22 greater than the thickness of the stack 2 measured parallel to the direction 4 by a spring 25 set between the element 20b and the pin 24 itself.

The pin 24 supports, on one of its top free ends, a tappet roller 26, which is mounted, so that it can turn, on the pin 24 itself, and engages a cam 27 fixed to the frame 2 parallel to the direction 8, so as to move from the aforementioned raised released position into a lowered gripping position, in which the pin 24 engages the top face 2a of the corresponding stack 2 to grip the stack 2 itself on the surface P1.

In use, each pocket 21 is designed to receive, at the input station 6 and with the corresponding pressure members 23 set in their raised released positions, a corresponding stack 2 from a conveyor device 28 of a known type, which comprises, in the case in point, a plurality of belts 29, each of which can move on a vertical plane parallel to that of the other belts 29 and is wound in a loop around a pair of pulleys (not illustrated) mounted, so that they can turn, on the frame 11, and has a top conveying branch 30 substantially co-planar to the surface P1.

Once the elements 20*b* have engaged the stack 2, the pressure members 23 move into their lowered gripping positions for gripping the stack 2 on the conveying surface P1, and the stack 2 is fed along the path P and to the output station 7.

At the station 7, the stack 2 is fed first through a feed channel 31, which is defined by two bars 32 set parallel to one another and parallel to the direction 19, and has a height, measured parallel to the direction 4, that is at least equal to the thickness of a stack 2, and then against a corresponding sheet of wrapping paper 33, which is set orthogonal to the direction 8 and is folded over the stack 2 in a substantially U-shaped configuration, following upon contact with the stack 2 and the thrust imparted on the stack 2 by the elements 20*b*.

With reference to the above description, it should be pointed out that:

- the cam 27 is shaped so that, when each stack 2 engages the corresponding sheet of wrapping paper 33, the pressure members 23 of the corresponding pocket 21 are set in their lowered gripping positions;
- the rate of advance of the belts 10 approximates with a degree of underestimation the rate of advance of the belts 15 so as to enable the elements 20*b* of each pocket 21 to engage the corresponding stack 2 and to remain in contact with the stack 2; and
- the positions of the conveyors 14 in the direction 4 are controlled selectively according to the thickness of the stacks 2.

What is claimed is:

1. A device for conveying stacks of sheets of paper, said device comprising a pocket conveyor provided with a plurality of pockets, each of which has a resting surface for a corresponding said stack and is designed to feed the stack along a path that is substantially parallel to said resting surface, said device being characterized in that it comprises pressure means set along said path for gripping each of said stacks on said resting surface during at least part of the displacement of said stack along the path, first actuator means for displacing said pressure means from a gripping position for gripping each stack on the resting surface during displacement of the stack along said path to a released position for releasing each stack, and second actuator means designed for displacing said pressure means from the released position to the gripping position, said first actuator means comprising elastic thrust means designed to maintain the pressure means normally in said released position and said second actuator means comprising cam means designed to displace the pressure means into said gripping position against the action of said elastic thrust means.

2. The device according to claim 1, further comprising conveying means designed for causing said pressure means to advance along said path in phase with each of said pockets.

3. The device according to claim 1, in which said pocket conveyor has an input station and an output station, each pocket being designed to feed the corresponding stack to said output station and against a corresponding sheet of wrapping paper set orthogonal to said path, and the actuator means being designed to maintain the pressure means in said gripping position when the stack itself engages the corresponding sheet of wrapping paper.

4. The device according to claim 1, in which said pressure means comprise, for each of said pockets, at least one pressure member.

5. The device according to claim 4, in which said pressure members are mounted on said pocket conveyor.

6. The device according to claim 1, in which each of said stacks comprises a plurality of sheets set on top of one another in a direction substantially orthogonal to said resting surface.

7. A device for conveying stacks of sheets of paper, said device comprising a pocket conveyor provided with a plurality of pockets, each of which has a resting surface for a corresponding said stack and is designed to feed the stack along a path that is substantially parallel to said resting surface, pressure means set along said path for gripping each of said stacks on said resting surface during at least part of the displacement of said stack along the path, and actuator means for displacing said pressure means from and towards a gripping position for gripping each stack on the resting surface during displacement of the stack along said path, wherein said pocket conveyor has an input station and an output station, each pocket being designed to feed the corresponding stack to said output station and against a corresponding sheet of wrapping paper set orthogonal to said path, and the actuator means being designed to maintain the pressure means in said gripping position when the stack itself engages the corresponding sheet of wrapping paper.

* * * * *